United States Patent
Ziegler et al.

(10) Patent No.: US 9,803,690 B2
(45) Date of Patent: *Oct. 31, 2017

(54) MAINTENANCE-FREE SLIDE BEARING WITH A COMBINED ADHESIVE SLIDING LAYER

(71) Applicant: SAINT-GOBAIN PERFORMANCE PLASTICS PAMPUS GMBH, Willich (DE)

(72) Inventors: Julia Ziegler, Ratingen (DE); Olaf Schmitjes, Essen (DE); Marc A. Aerts, Oud Turnhout (BE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 89 days.

This patent is subject to a terminal disclaimer.

(21) Appl. No.: 14/040,383

(22) Filed: Sep. 27, 2013

(65) Prior Publication Data

US 2014/0100144 A1 Apr. 10, 2014

Related U.S. Application Data

(60) Provisional application No. 61/707,454, filed on Sep. 28, 2012.

(51) Int. Cl.
*F16C 33/02* (2006.01)
*F16C 33/20* (2006.01)
(Continued)

(52) U.S. Cl.
CPC ............ *F16C 33/208* (2013.01); *B32B 15/08* (2013.01); *B32B 15/085* (2013.01); *B32B 27/20* (2013.01);
(Continued)

(58) Field of Classification Search
CPC ................. F16C 33/02; F16C 33/20
(Continued)

(56) References Cited

U.S. PATENT DOCUMENTS

| | | |
|---|---|---|
| 3,692,558 A | 9/1972 | Werner, Jr. et al. |
| 3,697,309 A | 10/1972 | Werner, Jr. |

(Continued)

FOREIGN PATENT DOCUMENTS

| | | |
|---|---|---|
| CA | 1322747 C | 10/1993 |
| CA | 2152279 A1 | 7/1994 |

(Continued)

OTHER PUBLICATIONS

International Search Report from PCT/EP2013/063672 dated Sep. 25, 2013, 1 pg.
(Continued)

*Primary Examiner* — Ellen McAvoy
(74) *Attorney, Agent, or Firm* — Chi S. Kim; Abel Law Group, LLP

(57) ABSTRACT

Slide bearings and methods of producing slide bearings are disclosed. The slide bearing has a metal support and a sliding layer. No other layer is in contact with the sliding layer. The sliding layer is applied directly to the metal support. The sliding layer comprises a mixture of at least two polymers P1 and P2, wherein P1 is a fluoropolymer. P2 is a non-fluorinated thermoplastic polymer.

20 Claims, 5 Drawing Sheets

(51) Int. Cl.
*B32B 15/08* (2006.01)
*B32B 15/085* (2006.01)
*B32B 27/20* (2006.01)
*B32B 27/28* (2006.01)
*B32B 27/32* (2006.01)

(52) U.S. Cl.
CPC .......... *B32B 27/285* (2013.01); *B32B 27/288* (2013.01); *B32B 27/322* (2013.01); *F16C 33/201* (2013.01); *B32B 2250/02* (2013.01); *B32B 2262/10* (2013.01); *B32B 2264/10* (2013.01); *B32B 2270/00* (2013.01); *B32B 2307/746* (2013.01); *B32B 2605/00* (2013.01); *F16C 2208/22* (2013.01); *F16C 2208/30* (2013.01); *F16C 2208/58* (2013.01)

(58) Field of Classification Search
USPC .................................................. 508/103, 104
See application file for complete search history.

(56) References Cited

U.S. PATENT DOCUMENTS

| | | | |
|---|---|---|---|
| 3,911,161 A | 10/1975 | Nord et al. | |
| 4,011,361 A | 3/1977 | Vassiliou et al. | |
| 4,016,125 A | 4/1977 | Vassiliou et al. | |
| 4,039,713 A | 8/1977 | Vassiliou | |
| 4,049,863 A | 9/1977 | Vassiliou | |
| 4,070,525 A | 1/1978 | Vassiliou et al. | |
| 4,319,942 A | 3/1982 | Brenner | |
| 4,413,019 A | 11/1983 | Brenner | |
| 4,483,951 A | 11/1984 | Brenner | |
| 4,548,989 A | 10/1985 | Allen et al. | |
| 4,592,782 A | 6/1986 | Davies | |
| 4,595,718 A | 6/1986 | Allen et al. | |
| 4,624,887 A | 11/1986 | Bickle et al. | |
| 4,655,944 A * | 4/1987 | Mori .......................... | 428/545 |
| 4,812,367 A | 3/1989 | Bickle | |
| 4,868,234 A | 9/1989 | Tabb et al. | |
| 4,925,892 A | 5/1990 | Tabb et al. | |
| 5,039,575 A | 8/1991 | Mori et al. | |
| 5,230,961 A | 7/1993 | Tannenbaum | |
| 5,239,026 A | 8/1993 | Babirad et al. | |
| 5,364,682 A * | 11/1994 | Tanaka et al. ................ | 428/138 |
| 5,573,846 A | 11/1996 | Harig et al. | |
| 5,686,176 A | 11/1997 | Adam et al. | |
| 5,863,657 A | 1/1999 | Kawashima et al. | |
| 5,882,466 A | 3/1999 | Grootaert et al. | |
| 6,001,205 A | 12/1999 | Mauro | |
| 6,085,797 A | 7/2000 | Grabaum et al. | |
| 6,140,410 A | 10/2000 | Kolouch | |
| 6,183,137 B1 | 2/2001 | Kojima et al. | |
| 6,183,869 B1 | 2/2001 | Okuda et al. | |
| 6,258,413 B1 | 7/2001 | Woelki et al. | |
| 6,312,814 B1 | 11/2001 | Kolouch | |
| 6,316,534 B1 | 11/2001 | Shimokusuzono et al. | |
| 6,372,284 B1 | 4/2002 | Hess et al. | |
| 6,376,061 B1 * | 4/2002 | Adam .......................... | 428/327 |
| 6,413,588 B1 | 7/2002 | Pettus et al. | |
| 6,425,977 B2 | 7/2002 | McDonald et al. | |
| 6,528,143 B1 | 3/2003 | Adam et al. | |
| 6,531,950 B1 | 3/2003 | Becker et al. | |
| 6,565,257 B1 | 5/2003 | Kennedy et al. | |
| 6,569,816 B2 * | 5/2003 | Oohira et al. ................ | 508/107 |
| 6,726,994 B1 | 4/2004 | Araki et al. | |
| 6,759,129 B2 | 7/2004 | Fukushi | |
| 6,770,378 B1 | 8/2004 | Lehmann | |
| 7,022,402 B2 | 4/2006 | Lacourt | |
| 7,025,853 B2 | 4/2006 | Kesselmayer | |
| 7,241,817 B2 | 7/2007 | Bonnet et al. | |
| 7,491,446 B2 * | 2/2009 | Ueda ...................... F16C 33/16 | 384/300 |
| 7,581,734 B1 | 9/2009 | McLeod | |
| 7,829,618 B2 | 11/2010 | Longo et al. | |
| 7,887,922 B2 * | 2/2011 | Mayston et al. ................ | 428/457 |
| 7,910,527 B2 * | 3/2011 | Sawyer et al. ................ | 508/181 |
| 7,942,581 B2 | 5/2011 | Leonardelli | |
| 8,349,773 B2 * | 1/2013 | Takayanagi et al. ......... | 508/100 |
| 8,646,977 B2 | 2/2014 | Adam | |
| 8,802,602 B2 | 8/2014 | Schmitjes et al. | |
| 2002/0117280 A1 | 8/2002 | Howle et al. | |
| 2003/0024380 A1 | 2/2003 | Shimo et al. | |
| 2003/0044553 A1 | 3/2003 | Ramanathan et al. | |
| 2003/0049485 A1 | 3/2003 | Brupbacher et al. | |
| 2003/0079847 A1 | 5/2003 | Howle et al. | |
| 2003/0104223 A1 | 6/2003 | Ferm et al. | |
| 2003/0158338 A1 | 8/2003 | Jazenski et al. | |
| 2003/0207118 A1 | 11/2003 | Fukushi | |
| 2004/0006867 A1 | 1/2004 | Becker et al. | |
| 2004/0071987 A1 | 4/2004 | Bate | |
| 2004/0096610 A1 | 5/2004 | Ramanathan et al. | |
| 2004/0115465 A1 * | 6/2004 | Bickle ...................... B32B 15/04 | 428/626 |
| 2004/0115477 A1 | 6/2004 | Nesbitt | |
| 2004/0116792 A1 | 6/2004 | Nesbitt | |
| 2004/0167263 A1 | 8/2004 | Bate | |
| 2004/0228555 A1 | 11/2004 | Kim et al. | |
| 2005/0025977 A1 | 2/2005 | Adam et al. | |
| 2005/0048218 A1 | 3/2005 | Weidman | |
| 2005/0069778 A1 | 3/2005 | Bonnet et al. | |
| 2005/0090602 A1 | 4/2005 | Koshikawa | |
| 2005/0228441 A1 | 10/2005 | Wood et al. | |
| 2005/0233152 A1 | 10/2005 | Bate | |
| 2005/0266170 A1 | 12/2005 | Nesbitt | |
| 2006/0029795 A1 | 2/2006 | Sawyer et al. | |
| 2006/0110601 A1 | 5/2006 | Hennessey | |
| 2006/0229424 A1 | 10/2006 | Griswold et al. | |
| 2006/0247360 A1 | 11/2006 | Halasa et al. | |
| 2006/0247369 A1 | 11/2006 | Griswold et al. | |
| 2006/0247369 A1 | 11/2006 | Frye et al. | |
| 2007/0021544 A1 | 1/2007 | Yanase et al. | |
| 2007/0031275 A1 * | 2/2007 | Nogawa ...................... F04C 29/0021 | 418/55.2 |
| 2007/0092173 A1 | 4/2007 | Tsuji et al. | |
| 2007/0106294 A1 | 5/2007 | Nesbitt | |
| 2007/0110937 A1 | 5/2007 | Lokere et al. | |
| 2007/0123853 A1 | 5/2007 | Nesbitt | |
| 2007/0173590 A1 | 7/2007 | Longo et al. | |
| 2007/0177833 A1 * | 8/2007 | Egami ...................... F16C 33/201 | 384/279 |
| 2007/0225177 A1 | 9/2007 | Murase et al. | |
| 2007/0232502 A1 | 10/2007 | Tsutsui et al. | |
| 2007/0269151 A1 | 11/2007 | Nardi et al. | |
| 2007/0281872 A1 * | 12/2007 | Schubert et al. ............. | 508/103 |
| 2007/0298217 A1 | 12/2007 | Chen et al. | |
| 2008/0032060 A1 | 2/2008 | Nesbitt | |
| 2008/0050509 A1 | 2/2008 | Nesbitt | |
| 2008/0057251 A1 | 3/2008 | Griswold et al. | |
| 2008/0102307 A1 | 5/2008 | Zidar | |
| 2008/0113206 A1 | 5/2008 | Hoy et al. | |
| 2008/0159671 A1 | 7/2008 | Leonardelli | |
| 2008/0226933 A1 * | 9/2008 | Bickle ...................... F16C 33/201 | 428/545 |
| 2009/0092827 A1 | 4/2009 | Robinson | |
| 2009/0304957 A1 | 12/2009 | Jamil et al. | |
| 2010/0028684 A1 | 2/2010 | Mariscal et al. | |
| 2010/0047467 A1 | 2/2010 | Nesbitt | |
| 2010/0092119 A1 | 4/2010 | Angenheister | |
| 2010/0098360 A1 | 4/2010 | Schmitjes et al. | |
| 2010/0119188 A1 | 5/2010 | Hsueh et al. | |
| 2010/0197849 A1 | 8/2010 | Momose et al. | |
| 2010/0215834 A1 | 8/2010 | Nesbitt | |
| 2010/0239883 A1 | 9/2010 | Okladek et al. | |
| 2010/0290726 A1 | 11/2010 | Schlipf et al. | |
| 2010/0301525 A1 | 12/2010 | Price et al. | |
| 2010/0304063 A1 | 12/2010 | McCrea et al. | |
| 2011/0023726 A1 | 2/2011 | Nesbitt | |
| 2011/0049834 A1 | 3/2011 | Natu | |
| 2011/0159229 A1 | 6/2011 | Doehle et al. | |
| 2011/0262064 A1 | 10/2011 | Burgeff et al. | |
| 2011/0268944 A1 | 11/2011 | Adam et al. | |
| 2011/0305874 A1 | 12/2011 | Thoumazet et al. | |
| 2012/0008887 A1 | 1/2012 | Adam | |
| 2012/0275731 A1 | 11/2012 | Ziegler et al. | |

(56) References Cited

U.S. PATENT DOCUMENTS

| | | | | |
|---|---|---|---|---|
| 2013/0183488 A1* | 7/2013 | Liao | ................. | B32B 15/08 428/141 |
| 2013/0183539 A1* | 7/2013 | Guo | ................. | B05D 5/083 428/551 |
| 2013/0195388 A1* | 8/2013 | Ishii | ................. | F16C 33/22 384/322 |
| 2014/0010484 A1* | 1/2014 | Schmitjes | ............ | F16C 33/04 384/42 |
| 2014/0024563 A1* | 1/2014 | Heidecker et al. | ......... | 508/106 |
| 2014/0329728 A1* | 11/2014 | Peng et al. | ................. | 508/106 |

FOREIGN PATENT DOCUMENTS

| | | |
|---|---|---|
| CA | 2684543 A1 | 10/2008 |
| CN | 1037481 A | 11/1989 |
| CN | 1261386 A | 7/2000 |
| CN | 1401898 A | 3/2003 |
| CN | 1659028 A | 8/2005 |
| CN | 1705830 A | 12/2005 |
| CN | 1756911 A | 4/2006 |
| CN | 1823132 A | 8/2006 |
| CN | 101061191 A | 10/2007 |
| CN | 101126417 A | 2/2008 |
| CN | 101413543 A | 4/2009 |
| CN | 101715392 A | 5/2010 |
| CN | 102271906 A | 12/2011 |
| DE | 1932343 A1 | 1/1971 |
| DE | 1961833 A1 | 6/1971 |
| DE | 3021369 A1 | 12/1981 |
| DE | 3343697 A1 | 6/1984 |
| DE | 3401804 A1 | 7/1985 |
| DE | 3534242 A1 | 3/1987 |
| DE | 3601569 A1 | 7/1987 |
| DE | 3912716 A1 | 10/1990 |
| DE | 19823609 A1 | 12/1999 |
| DE | 102005046571 A1 | 4/2007 |
| DE | 102008055194 A1 | 7/2010 |
| EP | 0008542 A2 | 3/1980 |
| EP | 0119815 A2 | 9/1984 |
| EP | 3119815 A2 | 9/1984 |
| EP | 217462 A1 | 4/1987 |
| EP | 0223268 B1 | 3/1989 |
| EP | 0232922 B1 | 6/1989 |
| EP | 0394518 A1 | 10/1990 |
| EP | 0650987 A1 | 5/1995 |
| EP | 0848031 A1 | 6/1998 |
| EP | 0988898 A2 | 3/2000 |
| EP | 1077230 A1 | 2/2001 |
| EP | 1724104 A1 | 11/2006 |
| EP | 1892429 A2 | 2/2008 |
| EP | 2139675 A1 | 1/2010 |
| EP | 2702285 A2 | 3/2014 |
| FR | 1354161 A | 3/1964 |
| GB | 1265140 A | 3/1972 |
| GB | 1338234 A | 11/1973 |
| GB | 1472079 A | 4/1977 |
| GB | 2123430 A | 2/1984 |
| JP | 61-211525 A | 6/1986 |
| JP | 07-018035 A | 1/1995 |
| JP | 7-173446 A | 7/1995 |
| JP | 9-117095 A | 5/1997 |
| JP | 10-331855 A | 12/1998 |
| JP | 2000117888 A | 4/2000 |
| JP | 2000153575 A | 6/2000 |
| JP | 2000-192961 A | 7/2000 |
| JP | 2001511502 A | 8/2001 |
| JP | 2002-194380 A | 7/2002 |
| JP | 2004-019758 A | 1/2004 |
| JP | 2004-035890 A | 2/2004 |
| JP | 2004358904 A | 12/2004 |
| JP | 2005-015793 A | 1/2005 |
| JP | 2005035300 A | 2/2005 |
| JP | 04-505335 B2 | 4/2006 |
| JP | 2006-111885 A | 4/2006 |
| JP | 2007145894 A | 6/2007 |
| JP | 2008264305 A | 11/2008 |
| JP | 2010-525245 A | 7/2010 |
| KR | 20050106066 A | 11/2005 |
| KR | 20100012028 A | 2/2010 |
| KR | 20101237477 A | 2/2010 |
| MX | 2009011322 A | 12/2009 |
| RU | 2009139818 A | 5/2011 |
| RU | 2438877 C2 | 1/2012 |
| WO | 9415999 A1 | 7/1994 |
| WO | 9727003 A1 | 7/1997 |
| WO | 9844545 A1 | 10/1998 |
| WO | 9901675 A1 | 1/1999 |
| WO | 0029210 A1 | 5/2000 |
| WO | 02096644 A1 | 12/2002 |
| WO | 03027522 A2 | 4/2003 |
| WO | 2004056751 A1 | 7/2004 |
| WO | 2004056754 A1 | 7/2004 |
| WO | 2008094652 A2 | 8/2008 |
| WO | 2008096097 A1 | 8/2008 |
| WO | 2008121682 A2 | 10/2008 |
| WO | 2008128579 A1 | 10/2008 |
| WO | 2009144495 A2 | 12/2009 |
| WO | 2010038137 A1 | 4/2010 |
| WO | 2010076307 A1 | 7/2010 |
| WO | 2010138172 A1 | 12/2010 |
| WO | 2012149447 A2 | 1/2012 |
| WO | 2012149447 A2 | 11/2012 |
| WO | 2013101905 A1 | 7/2013 |
| WO | 2013101928 A1 | 7/2013 |
| WO | 2014001524 A1 | 1/2014 |

OTHER PUBLICATIONS

Search Report for FR1457516 dated Jan. 13, 2015, 6 pages.
International Search Report for PCT/EP2007/060736 dated Feb. 1, 2008, 1 page.
U.S. Appl. No. 12/582,335, 16 pages.
International Search Report for PCT/US2012/035621 mailed Nov. 29, 2012, 1 page.
U.S. Appl. No. 13/458,882, 28 pages.
International Search Report for PCT/US2012/071775 mailed Apr. 24, 2013, 1 pg.
International Search Report for PCT/US2012/071814 mailed Apr. 12, 2013, 1 pg.
French Search Report for FR1104125 dated Sep. 24, 2012, 3 pgs.
Briscoe, B. J., et al., "The friction and wear of Poly(tetrafluoroethylene)-Poly(etheretherketone) composites: an initial appraisal of the optimum composition," Wear, Elsevier Sequoia, Lausanne, CH, vol. 108, Jan. 1, 1986, pp. 357-374, XP002351273.
Zhang, Z. et al., "Wear of PEEK composites related to their mechanical performances," Tribology International Butterworth Scientific LDT, Guildford, GB, vol. 37, Jan. 1, 2004, pp. 271-277, XP002351274.
U.S. Appl. No. 113/728,405, filed Dec. 27, 2012, Inventors: Hanlin Liao et al., 28 pgs.
U.S. Appl. No. 13/728,262, filed Dec. 27, 2012, Inventors: Qiang Guo et al., 18 pgs.
Supplementary European Search Report issued Dec. 1, 2015 in European Application No. 12862673 (2 pages).
International Search Report for PCT/EP2013/070239 mailed on Jan. 8, 2014, 2 pages.

* cited by examiner

MAINTENANCE-FREE SLIDE BEARING WITH A COMBINED ADHESIVE SLIDING LAYER

CROSS-REFERENCE TO RELATED APPLICATION(S)

This application claims priority under 35 U.S.C. §119(e) to U.S. Patent Application No. 61/707,454 entitled "Maintenance-free Slide Bearing with a Combined Adhesive Sliding Layer," by Julia Ziegler, Olaf Schmitjes and Marc A. Aerts, filed Sep. 28, 2012, which is assigned to the current assignee hereof and incorporated herein by reference in its entirety.

FIELD OF THE DISCLOSURE

The disclosure relates to a maintenance-free slide bearing comprising a metal support and a sliding layer directly to the metal support.

BACKGROUND

Maintenance-free slide bearings which comprise a layer structure having a metallic support material, an intermediate layer and a sliding layer applied thereto have been known for a long time in a variety of forms from the prior art and are used in a wide variety of technical fields, for example in the field of automotive engineering.

EP 0 394 518 A1 describes a multilayer slide bearing material in which the metallic support material preferably consists of cold-rolled steel on which a layer of a copolymer of perfluoro(alkyl vinyl ether) and tetrafluoroethylene has been applied as intermediate layer. A sliding layer composed of a PTFE compound material is in turn applied to the intermediate layer. In this slide bearing material, the intermediate layer has the function of establishing firm adhesion of the sliding layer to the support material. In order firstly to ensure adhesion of the intermediate layer to the support material, the surface of the metallic support material in this known slide bearing material has to be pretreated in a suitable manner by wet chemical means. The best results appear to be achieved by chromating of the surface of the metallic support. However, this process is problematical for a variety of reasons, including environmental issues and others.

Slide bearing material with two layers are poorly investigated. US Patent Application Publication No. 2009/092827 discloses cookware having an outer surface comprising a polyaryletherketone and a fluoropolymer. However, such assembly is prepared in a liquid dispersion process, which results in articles that are unsuited for maintenance-free slide bearings. As such, there is a continued need for improved maintenance free slide bearings.

Therefore, it would be advantageous if a slide bearing could be produced that would not require extensive pretreatment of the metal support or an intermediate adhesive layer between the metal support and the sliding layer.

SUMMARY

In one aspect, a slide bearing can include a metal support and a sliding layer. The sliding layer can be extruded on and in direct contact with the metal support. The sliding layer can include at least two polymers and no other polymeric layer in direct contact with the sliding layer.

In a second aspect, a slide bearing can include a metal support and a sliding layer. The sliding layer can be extruded on and in direct contact with the metal support. The sliding layer includes a mixture of at least two polymers. The mixture can include one continuous phase. The mixture can further include one or more discontinuous phases. Furthermore, no other polymeric layer is in contact with the sliding layer.

In a third aspect, a method for forming a sliding layer includes blending two polymers P1 and P2. The method can further include heating the blend to form a polymer emulsion. The method includes extruding the polymer emulsion onto a metal support to form a sliding layer. The sliding layer can include polymeric droplets.

In a fourth aspect, a slide bearing can include a metal support and a sliding layer. The sliding layer is in direct contact with the metal support. The sliding layer can include a non-fluorinated thermoplastic. The non-fluorinated can be in a fluoropolymer matrix. The fluoropolymer matrix includes at least one fluoropolymer. No other polymer layer is in contact with the sliding layer.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
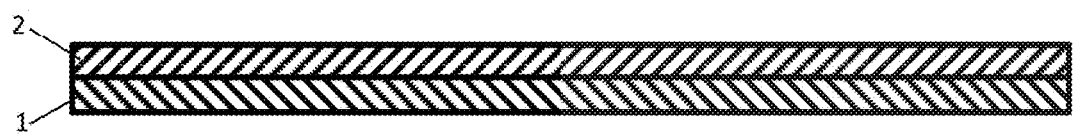
FIG. 1 shows an exemplary slide bearing in schematic sectional view.

In an embodiment, a slide bearing can include a metal support and a sliding layer applied directly thereto, in which adhesion of the sliding layer to the support material is ensured over the long term and whose production makes do without use of ecologically problematical processes for surface pretreatment.

In an embodiment, a slide bearing includes a sliding layer comprising two or more thermoplastic polymers. The sliding layer is extruded and in direct contact with the metal support. There is no other polymeric layer in direct contact with the sliding layer. The sliding layer includes at least two thermoplastic polymers, P1 and P2. The first polymer P1 is a fluorinated polymer. P1 can be selected from any fluoropolymer. In one example, P1 can be selected from a polytetrafluoroethylene (PTFE), a modified polytetrafluoroethylene (TFM), tetrafluoroethylene-hexafluoropropylene (FEP), a perfluoroalkoxyethylene (PFA), an ethylene-tetrafluoroethylene (ETFE), a tetrafluoro-ethylene-perfluoro (methyl vinyl ether) (MFA), an ethylene chlorotrifluoroethylene copolymer (ECTFE), a polychlorotrifluoroethylene (PCTFE), a polyvinylidene fluoride (PVDF). In another example, P1 can be a combination of two or more fluoropolymers.

The second polymer, P2, is a non-fluorinated thermoplastic polymer. P2 can be any non-fluorinated thermoplastic polymer. In an example, P2 can be selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES). In another example, P2 can be a combination of two or more non-fluorinated thermoplastic polymers.

The fluorinated polymer, P1, and the non-fluorinated thermoplastic polymer, P2, can be in any weight ratio. For example, the weight ratio of P1:P2 can be about 1:99, about 5:95, about 10:90, about 15:85, about 20:80, about 25:75, about 30:70, about 35:65, about 40:60, about 45:55, about 50:50, about 55:45, about 60:40, about 65:35, about 30:70, about 25:75, about 20:80, about 15:85, about 10:90, about 5:95, about 1:99. In one particular example, P1 is present in an equal or greater weight than P2. For example, the ratio P1:P2 can be about 99:1, about 98:2, about 97:3, about 96:4, about 95:5, about 94:6, about 93:7, about 92:8, or about 91:9.

In an example, each of the polymer of the sliding layer can present at various weight percentages. For example, P1 can comprise at least about 1 wt %, at least about 2 wt %, at least about 5 wt %, at least about 10 wt %, at least about 20 wt %, at least about 30 wt %, at least about 40 wt %, or at least about 50 wt % of the adhesive layer. In another example, P2 can comprise at least about 1 wt %, at least about 2 wt %, at least about 5 wt %, at least about 10 wt %, at least about 20 wt %, at least about 30 wt %, at least about 40 wt %, or at least about 50 wt % of the sliding layer.

In yet another embodiment, the polymers of the sliding layer do not exceed certain weight percentages. For example, the weight percentage of P1 is not greater than about 95 wt %, not greater than about 90 wt %, not greater than about 80 wt %, not greater than about 70 wt %, not greater than about 60 wt %, not greater than about 50 wt %, not greater than about 40 wt %, not greater than about 30 wt %, not greater than about 20 wt %, not greater than about 10 wt %, not greater than about 5 wt %, not greater than about 2 wt %, not greater than about 1 wt % of the sliding layer.

In another embodiment, the weight percentage of P2 is not greater than about 95 wt %, not greater than about 90 wt %, not greater than about 80 wt %, not greater than about 70 wt %, not greater than about 60 wt %, not greater than about 50 wt %, not greater than about 40 wt %, not greater than about 30 wt %, not greater than about 20 wt %, not greater than about 10 wt %, not greater than about 5 wt %, not greater than about 2 wt %, not greater than about 1 wt % of the sliding layer.

Any one of the polymers P1 or P2 can be modified or functionalized. The modification of at least one thermoplastic polymer includes incorporation of functional groups that improve tribological, rheological, or adhesive properties of the unmodified thermoplastic. In embodiments, modified polymers include functional groups, such as keto groups, alkoxy groups, hydroxyl groups, carboxyl groups, or carboxyl ester groups as depicted by the following formulas:

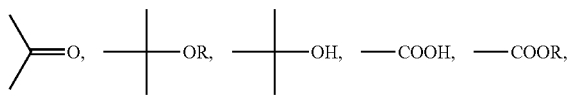

wherein
the radicals R are cyclic or linear organic residues having from 1 to 20 carbon atoms.

The functional groups can be incorporated into the thermoplastic polymer (P) by addition of at least one modifying agent (M). Suitable modifying agents are, for example, maleic acid and derivatives thereof, in particular the anhydride (1) thereof, itaconic acid and derivatives thereof, in particular the anhydride (2) thereof, and/or citraconic acid and derivatives thereof, in particular the anhydride (3) thereof. Other modifying agents include methylacryl acid and derivatives thereof (4) or its isomer crotonic acid and derivatives (5), wherein R in (4) and (5) can be hydrogen, a cyclic or linear organic residue having from 1 to 20 carbon atoms.

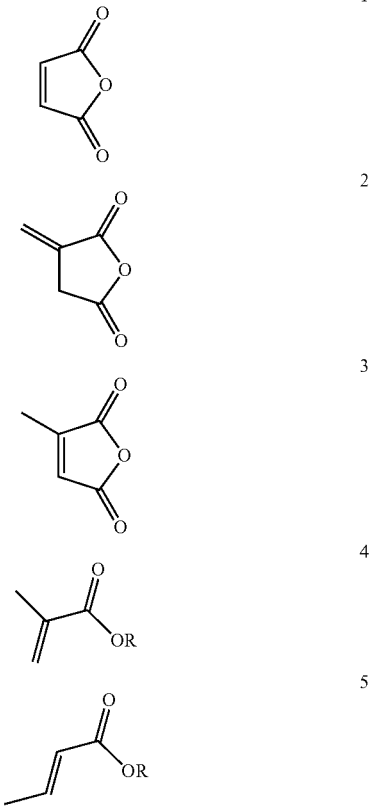

Here, the ratio of the polymer (P) to the modifying agent (M) can be from 99.9 mol % of (P): 0.1 mol % of (M) to 80 mol % of (P): 20 mol % of (M).

For example, variation of the ratio of polymer (P) and modifying agent (M) provides for changes in the MFI (melt flow index), as specified by DIN EN ISO 1133, which is incorporated herein in its entirety. The MFI is determined by the mass of polymer that can extrude through an orifice of defined dimensions at a specified temperature and load within 10 minutes. In general, the load is 5 kg and the temperature is approximately the melting point of the material to be characterized. For example, PFA has a melting point of approximately 372° C. and FEP or ETFE have melting points of approximately 297° C.

In an embodiment, the MFI of the sliding layer can be from 1 to 100 g/10 min, such as from 2 to 50 g/10 min, or from 3 to 25 g/10 min.

In embodiments, the functionalized polymer can be prepared from any fluoropolymer, including, tetrafluoroethylene-hexafluoropropylene (FEP), perfluoroalkoxyethylene (PFA), ethylene-tetrafluoroethylene (ETFE), tetrafluoro-ethylene-perfluoro(methyl vinyl ether) (MFA), modified polytetrafluoroethylene (TFM), polyvinylidene fluoride (PVDF), ethylene-chlorotrifluoroethylene (ECTFE).

In yet another embodiment, the sliding layer can comprise not only at least one functionalized thermoplastic polymer but also a copolymer of perfluoro(alkyl vinyl ether) of the formula: $CF_2=CF-O-R_1$, where $R_1$ is a perfluoroethyl, perfluoro-n-propyl or perfluoro-n-butyl radical, and tetrafluoroethylene.

In another embodiment, the sliding layer can include two of the functionalized thermoplastic polymer as described above.

In one particular embodiment, the sliding layer can include a perfluoroalkoxyethylene (PFA) and a polyether ether ketone (PEEK). The PFA and PEEK can be present in the sliding layer in a weight ratio from about 5:95 to about 95:5, such as from about 10:90 to about 90:10, such as from about 20:80 to about 80:20, such as from about 30:70 to about 70:30, such as from about 40:60 to about 60:40, or such as about 50:50.

In even one further embodiment, the sliding later can include a greater or equal amount of PFA. Thus, the weight ratio of PEEK:PFA can be from about 1:99 to about 50:50, such as from about 2:98 to about 50:50, from about 3:97 to about 50:50, from about 4:96 to about 50:50, from about 5:95 to about 50:50, from about 10:90 to about 50:50, from about 15:85 to about 50:50, from about 20:80 to about 50:50, from about 25:75 to about 50:50, from about 30:70 to about 50:50, from about 35:65 to about 50:50, from about 40:60 to about 50:50, or even from about 45:55 to about 50:50.

In an embodiment, the slide bearing can be characterized by adhesion of the sliding layer to the support material brought about by the at least two polymers in the sliding layer including a functionalized thermoplastic polymer having functional groups of the abovementioned type when compared to non-functionalized thermoplastic polymers. Such adhesion can be determined, for example, by a 180°-T-peel-test and is further described herein.

To improve the mechanical and general physical properties of the slide bearing, the sliding layer can contain fillers. Fillers can increase and/or improve the thermal conductivity and/or the wear properties. Fillers can be fibers, inorganic materials, thermoplastic materials, mineral materials, or mixtures thereof. For example, fibers can include glass fibers, carbon fibers, and aramids. Inorganic materials can include ceramic materials, carbon, glass, graphite, aluminum oxide, molybdenum sulfide, bronze, and silicon carbide. The inorganic materials can be in the form of woven fabrics, powders, spheres or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyetherketone (PEK), and aromatic polyesters (Ekonol). Example of mineral materials can include wollastonite and barium sulfate.

The proportion of filler in the sliding layer can be from about 1 to about 40% by volume, such as from about 5 to about 30% by volume, from about 10 to about 25% by volume, or even from about 20 to about 25% by volume.

The sliding layer applied to the support can include an embedded fluoropolymer as an inclusion compound. Such compounds can be made from polytetrafluoroethylene (PTFE), polyamide (PA), polyether ether ketone (PEEK), or a mixture thereof. In a particular embodiment, the sliding layer can include a PTFE inclusion compound.

In another embodiment, the sliding layer can be configured to be air-permeable, perforated, or porous. Such texture in combination with a filler or lubricant improves thermal conductivity.

In an embodiment, the slide bearing has excellent sliding properties and a long life at appropriate thicknesses. The thickness of the sliding layer is between about 0.01 mm to about 1.5 mm, such as between 0.1 mm to about 1.0 mm, or between about 0.1 mm to about 0.5 mm, or even between about 0.1 mm to about 0.35 mm.

In one embodiment, the metal support is cold-rolled steel. In another embodiment, the metal support can be cold-rolled and subsequently electrolytically zinc-plated steel, aluminum, or stainless steel. It is contemplated that ecologically problematical and disposal-intensive wet chemical pretreatment processes, in particular chromating, can be dispensed with.

Physical processes for surface pretreatment of the adhesive (e.g. plasma pretreatment by corona discharge) as are described, for example, in EP 0 848 031 B1 in which a functionalized thermoplastic fluoropolymer is likewise described as constituent of a laminate, are no longer necessary. The process for producing the slide bearing can therefore be carried out at significantly lower costs and with less ecological impact compared to the prior art.

The metal support can be of any structure or shape. In embodiments, the metal support can be a plate, a sheet, a woven fabric, a mesh, or metal foam. In an embodiment, the metal support can include steel, cold-rolled steel material No. 1.0338, cold-rolled steel material No. 1.0347, matt zinc-plated steel, stainless steel material No. 1.4512, stainless steel material No. 1.4720, stainless steel material No. 1.4310, aluminum, alloys, or any combinations thereof.

In another embodiment, the metal support can have a coating. The coating can be a layer of another metal or alloy. In an embodiment, the coating is a metal or alloy containing at least one of the following metals: chromium, molybdenum, tungsten, manganese, iron, ruthenium, osmium, cobalt, rhodium, iridium, nickel, palladium, platinum, copper, silver, gold, zinc, cadmium, mercury, aluminum, gallium, indium, thallium, silicon, germanium, tin, lead, antimony, and bismuth.

In yet another embodiment, the coating can be a copper alloy, a copper-tin alloy, a copper-zinc alloy, a bronze, a phosphor bronze, a silicon bronze, a brass, or any combination thereof.

In even one further embodiment, the metal support used in the slide bearing can have a surface of a varying nature. Owing to the improved adhesion properties of the adhesive layer comprising the mixture of polymers, the metal support can have either a smooth surface, a roughened, or structured surface (for example, as achieved by brushing, sandblasting, embossing of a structure). Regardless of the surface roughness, the surface can also be modified to form a plated surface, such as an electrolytically zinc-plated surface.

For example, surface roughness of the metal support can be at least about 0.01 micron, at least about 0.02 micron, at least about 0.05 micron, at least about 0.1 micron, at least about 0.5 micron, at least about 1 micron, at least about 2 microns, at least about 5 microns, at least about 10 microns, at least about 20 microns, at least about 50 microns, at least about 100 microns, at least about 200 microns, or at least about 400 microns.

In another embodiment, the surface roughness is less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, or even less than about 1 micron.

In yet another embodiment, the metal support can have a surface roughness in the range from about 0.1 micron to about 400 microns, from about 0.5 micron to about 100 microns, or from about 1 micron to about 50 microns.

The surface of the metal can be treated by electrolytic zinc-plating to roughen, upgrade, or coat the surface. This is done before application of the adhesive layer. In another embodiment, the surface area of the metal support can be increased by mechanical structuring. The structuring can include brush-finishing, sand-blasting, etching, perforating, pickling, punching, pressing, curling, deep drawing, decambering, incremental sheet forming, ironing, laser cutting, rolling, hammering, embossing, undercutting, and any combinations thereof. For example, embossing of a structure, allows for the possibility of intermeshing, which has a positive effect on the resulting bonding forces.

In an embodiment, a process for producing slide bearing can include blending at least two fluoropolymers P1 and P2, wherein P1 is selected from perfluoroalkoxyethylene (PFA) or tetrafluoroethylene-hexafluoropropylene (FEP) to form a polymer blend. The method can include heating the polymer blend and applying the blend onto a metal support to form an adhesive layer. The method can further include joining a sliding layer onto the adhesive layer. The joining of the adhesive layer and the sliding layer over their area to the support can be under pressure and/or with introduction of heat.

In one process, both the metal support and the sliding layer are in each case rolled off a roll as continuous material. Adhesive polymer is applied to the metal support and the layers are joined to one another under pressure and at elevated temperature in a laminating roller apparatus. To achieve further-improved adhesion of the adhesive layer to the metal support together with improved corrosion properties of the metal support, an embodiment of the process provides for the surface of the metal support to be roughed and/or surface-upgraded. In other embodiments, the method can include coating the metal surface.

In yet another embodiment, the sliding layer can include a mixture of at least two polymers, wherein the mixture comprises one continuous phase and at least one discontinuous phase.

In one embodiment, the discontinuous phase is in the form of droplets in the continuous phase. The droplets have a primary aspect ratio of at least about 2:1, at least about 3:1, at least about 4:1, or at least about 5:1. The primary aspect ratio means the ratio of the longest dimension over the second longest dimension, wherein the two dimensions are in orthogonal relation to each other.

In yet another embodiment, the droplets have a secondary aspect ratio of at least about 1:1, at least about 2:1, at least about 3:1, or at least about 4:1. The secondary aspect ratio means the ratio of the second longest dimension over the third longest dimension, wherein the two dimensions are in orthogonal relation to each other.

In one further embodiment, at least 50 percent of the droplets have a primary dimension not greater than about 30 microns, not greater than about 25 microns, not greater than about 20 microns, not greater than about 18 microns, not greater than about 15 microns, not greater than about 13 microns, or even not greater than about 10 microns.

In yet another embodiment, at least 50 percent of the droplets have a secondary dimension not greater than about 20 microns, not greater than about 18 microns, not greater than about 15 microns, not greater than about 13 microns, not greater than about 10 microns, not greater than about 8 microns, not greater than about 5 microns, or not greater than about 3 microns.

In even one further embodiment, at least 50 percent of the droplets have a tertiary dimension not greater than about 20 microns, not greater than about 18 microns, not greater than about 15 microns, not greater than about 13 microns, not greater than about 10 microns, not greater than about 8 microns, not greater than about 5 microns, not greater than about 3 microns.

In one particular embodiment, the droplets have an inhomogeneous distribution in size throughout the sliding layer. An inhomogeneous size distribution in a sliding layer is established when there is a gradient of the primary dimension from the center of the sliding layer to the edges of the sliding layer. For example, in one embodiment, the droplets in the center region, e.g., within 50 microns of the centerline of the sliding layer, can have an average droplet size larger than the droplets in the edge region, i.e. within 50 microns of the surface or edge of the sliding layer. In one example, the average droplet size in the center region can be 7 microns gradually decreasing to an average droplet size in the edge region of 1 micron.

In a further embodiment, the discontinuous phase includes a non-fluorinated polymer. The polymer can be selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), or any combination thereof.

In another embodiment, the continuous phase includes a fluoropolymer. The fluoropolymer can be selected from a polytetrafluoroethylene (PTFE), a modified polytetrafluoroethylene (TFM), a tetrafluoroethylene-hexafluoropropylene (FEP), a perfluoroalkoxyethylene (PFA), an ethylene-tetrafluoroethylene (ETFE), a tetrafluoro-ethylene-perfluoro (methyl vinyl ether) (MFA), an ethylene chlorotrifluoroethylene copolymer (ECTFE), a polychlorotrifluoroethylene (PCTFE), a polyvinylidene fluoride (PVDF), or any combination thereof. In yet another embodiment, the discontinuous phase can be a mixture of two polymers.

Any of the polymers of the discontinuous or continuous phase can be modified or functionalized. More specifically, the functionalized polymer can have functional groups which incorporated into the polymer. The functional groups are selected from

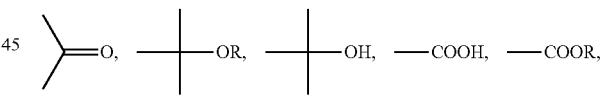

wherein R is selected from cyclic or linear organic groups having 1 to 20 carbon atoms In a further embodiment, the continuous phase can further include a filler. In yet another embodiment, the droplets forming the discontinuous phase can include a filler. Consequently, in one embodiment, the continuous phase can include a filler and the diccontinous phase can include the same or a different filler. Fillers can be any conventionally used material or a material described herein as a filler.

In one particular embodiment, the sliding layer has a perfluoroalkoxyethylene (PFA) as the continuous phase and a polyether ether ketone (PEEK) as the discontinuous phase.

In yet another embodiment, the sliding layer in can be a non-fluorinated thermoplastic in a fluoropolymer matrix. The fluoropolymer matrix can include one or more fluoropolymers as described herein. In one example, the one or more fluoropolymers of the fluoropolymer matrix make at least about 50 wt % of the combined weight of the fluoropolymer matrix and the non-fluorinated thermoplastic. In a further example, the fluoropolymers make at least about 60 wt %, such as at least about 65 wt %, at least about 70 wt %, at least about 75 wt %, at least about 80 wt %, at least about 85 wt %, at least about 90 wt %, or even at least about 95 wt %. In yet another embodiment, the one or more fluoropolymers of the fluoropolymer matrix are not greater than about 95 wt % of the combined weight of the fluoropolymer matrix and the non-fluorinated thermoplastic, such as not greater than about 90 wt %, not greater than about 80 wt %, not greater than about 70 wt %, or even not greater than about 60 wt %.

The structure of an exemplary maintenance-free slide bearing is shown in FIG. 1. Here, the metal support is denoted by 1, while 2 denotes the sliding layer applied thereto. In an embodiment, the sliding layer 2 is extruded on and in direct contact with the metal support 1. There is no other polymeric layer in contact with sliding layer 2.

In an embodiment, the sliding layer 2 comprises a polymer mixture layer which includes a polymer mixture of thermoplastic polymers. The sliding layer includes at least two thermoplastic polymers, P1 and P2. The first polymer P1 is a fluorinated polymer. P1 can be selected from any fluoropolymer. In one example, P1 can be selected from a polytetrafluoroethylene (PTFE), a modified polytetrafluoroethylene (TFM), tetrafluoroethylene-hexafluoropropylene (FEP), a perfluoroalkoxyethylene (PFA), an ethylene-tetrafluoroethylene (ETFE), a tetrafluoro-ethylene-perfluoro (methyl vinyl ether) (MFA), an ethylene chlorotrifluoroethylene copolymer (ECTFE), a polychlorotrifluoroethylene (PCTFE), a polyvinylidene fluoride (PVDF). In another example, P1 can be a combination of two or more fluoropolymers.

The second polymer, P2, is a non-fluorinated thermoplastic polymer. P2 can be any non-fluorinated thermoplastic polymer. In an example, P2 can be selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES). In another example, P2 can be a combination of two or more non-fluorinated thermoplastic polymers.

The polymers can be further modified to include functional groups. The modified fluoropolymer has functional groups as depicted by the following formulas:

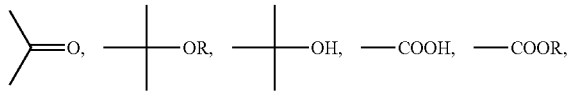

wherein
the radical R is cyclic or linear organic residues having from 1 to 20 carbon atoms. The functional groups can be incorporated into the thermoplastic polymer (P) by addition of at least one modifying agent (M). Suitable modifying agents are, for example, maleic acid and derivatives thereof, in particular the anhydride thereof, itaconic acid and derivatives thereof, in particular the anhydride thereof, and/or citraconic acid and derivatives thereof, in particular the anhydride thereof.

The sliding layer 2 can contain various fillers to improve the mechanical properties, e.g. fibers, inorganic materials, thermoplastic materials, or mineral materials, or mixtures thereof. Examples of fibers can include glass fibers, carbon fibers, and aramids. Examples of inorganic materials can include ceramic materials, carbon, glass, graphite, aluminum oxide, molybdenum sulfide, bronze, and silicon carbide. The inorganic materials can be in the form of woven fabrics, powders, spheres, or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyetherketone (PEK), and aromatic polyesters (Ekonol). Examples of mineral materials can include wollastonite and barium sulfate.

In an embodiment, the improved adhesive strength can be determined by means of a 180° peel test using sandwich laminates.

EXAMPLES

180°-T-Peel-Test

The 180°-T-peel test is described in DIN EN 1895, which is incorporated herein in its entirety. Strips of specimens having a five-layer structure are prepared. The layer set-up is: Steel backing, adhesive, sliding layer, adhesive, steel backing. The strips have a width of 25 mm. Clamps are affixed at one end to the opposing steel lips. The steel backings are pulled apart and the peel force for separating the steel backings is measured.

Figure 2A:
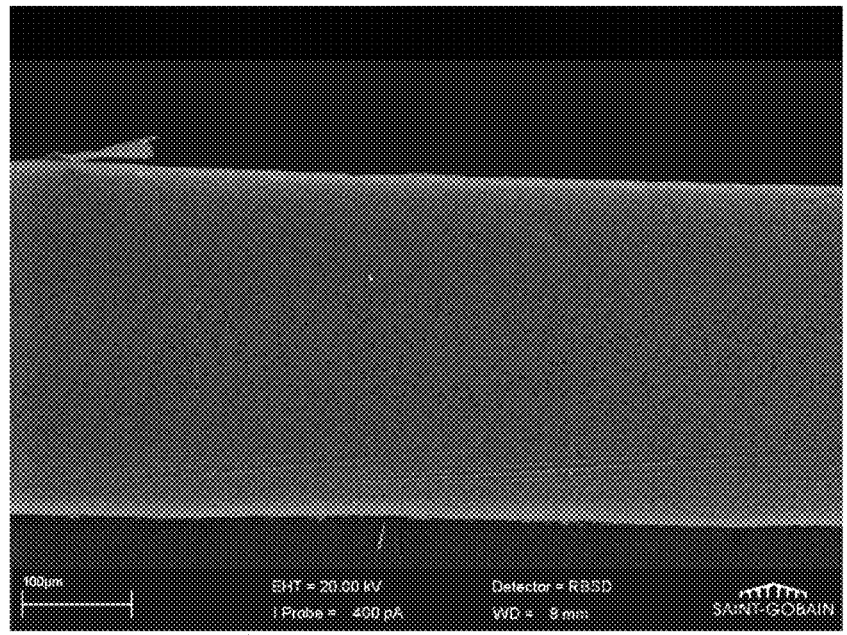
FIGS. 2a, 2b, 2c and 3a, 3b, and 3c show cross-sectional scanning electron microscopy views of a sliding layer sample.
Figure 2B:
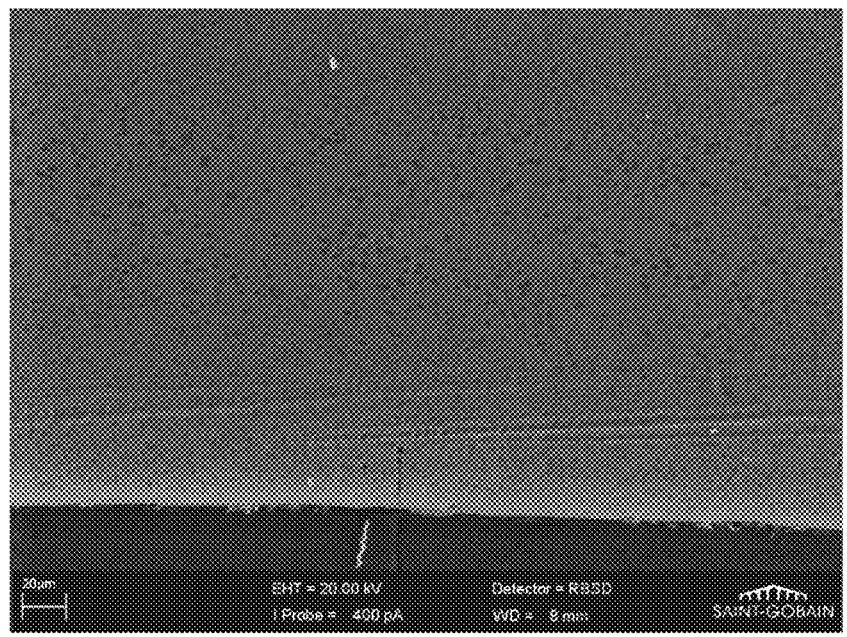
Figure 2C:
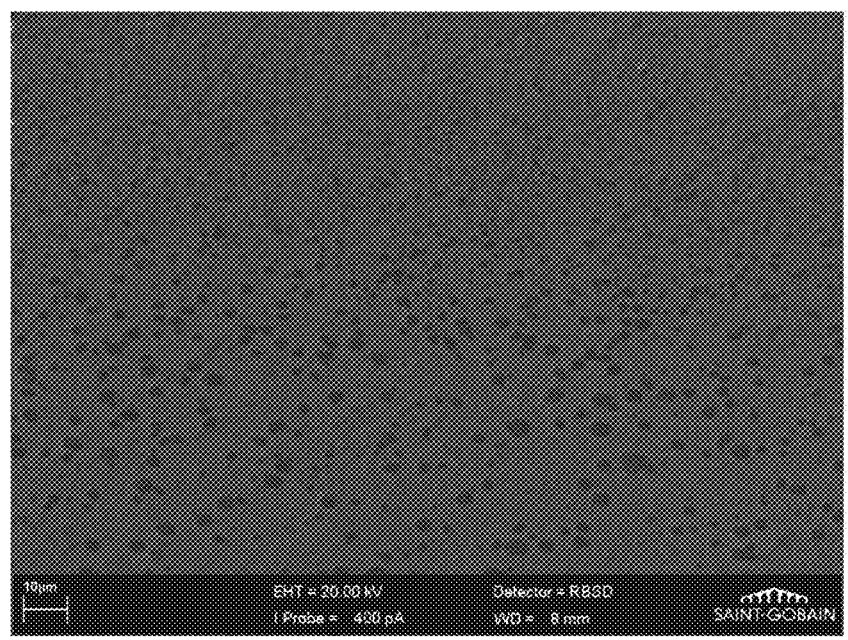
Figure 3A:
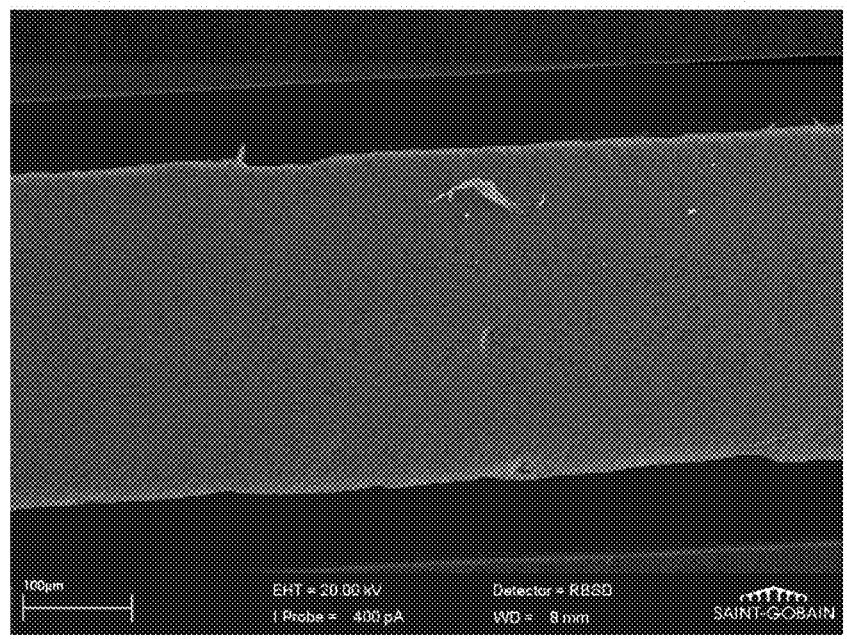
Figure 3B:
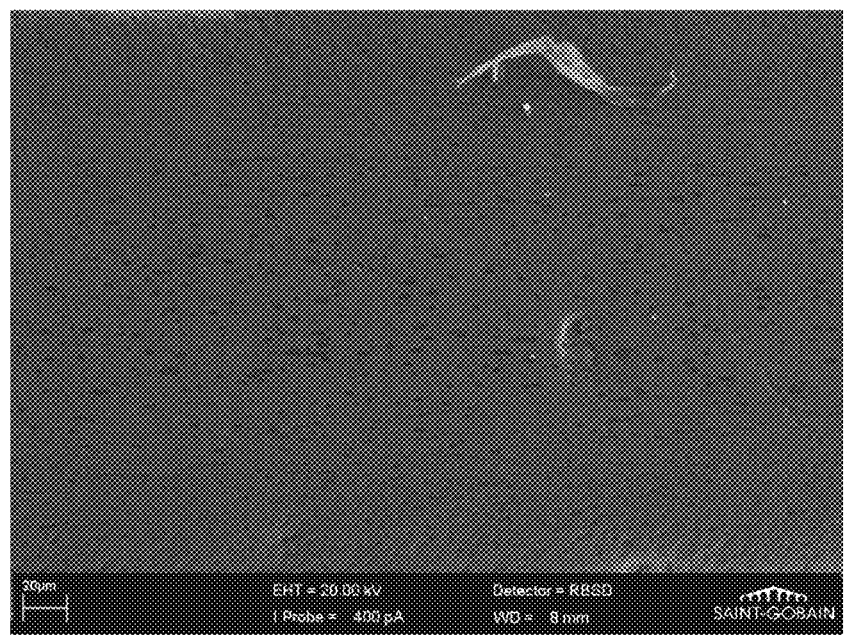
Figure 3C:
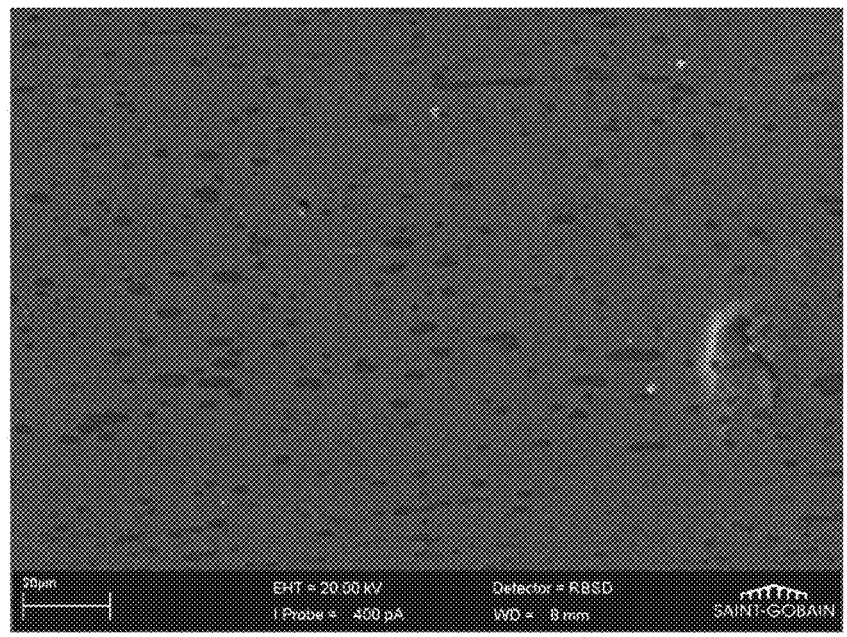

FIGS. 2 and 3 depict cross-sectional views of an extruded sliding layer using a Scanning Electron Microscope (SEM) LEO VP 435 by Carl Zeiss. The sliding layer is a mixture of PFA and PEEK in a weight ratio of 90:10. FIGS. 2a, 2b, and 2c show the side across the extrusion direction at various magnifications. FIGS. 3a, 3b, and 3c show the side parallel to the extrusion direction at various magnifications.

As can be seen from the scans, PEEK does not or does only poorly mix with PFA to form a uniform material. Isles of PEEK are present as elongated droplets dispersed in the PFA matrix. The droplets are smaller at the edges of the extruded layer than in the center. The scans show an inhomogeneous distribution in size of the droplets due to melt shearing occurring at the edges during extruding.

A slide bearing can include a metal support; a sliding layer, the sliding layer being extruded on and in direct contact with the metal support, wherein the sliding layer comprises at least two polymers. In an example, there is no other polymeric layer in direct contact with the sliding layer. In another example, the polymers in the slide bearing include thermoplastics. In yet another example, at least one polymer includes a fluorinated thermoplastic.

In an example, the fluorinated thermoplastic can be selected from a polytetrafluoroethylene (PTFE), a modified polytetrafluoroethylene (TFM), tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

In yet one other example, the fluorinated thermoplastic can be a functionalized polymer having functional groups which are incorporated into the fluorinated thermoplastic. The functional groups can be selected from

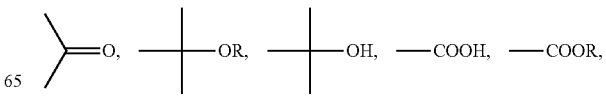

wherein R is selected from cyclic or linear organic groups having 1 to 20 carbon atoms.

In one further example, the slide bearing can also include a polymer which is a non-fluorinated thermoplastic. The non-fluorinated thermoplastic can be selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), or any combination thereof.

In another example, the fluorinated thermoplastic can be present in the sliding layer in an amount greater than the amount of the non-fluorinated thermoplastic.

In an example, the sliding layer can further comprise a filler. The filler can be selected from silicon dioxide, aluminum oxide, a titanium dioxide, a zirconium oxide, magnesium oxide, calcium oxide, boron oxide, aluminum carbonate, magnesium carbonate, calcium carbonate, a magnesium aluminum carbonate, an aluminum silicate, a calcium silicate, a magnesium silicate, a magnesium aluminum silicate, a bentonite, a kaolin, a mica, a talc, a silicon carbide, molybdenum sulfide, a bronze, a wollastonite, barium sulfate, glass fiber, glass bead, glass flake, carbon fiber, carbon nanotube, alumina fiber, silicon carbide fiber, ceramic fiber, ceramic material, gypsum fiber, carbon, graphite, an aramid, a nylon, a woven fabric, a polyimide (PI), a polyamidimide (PAI), a polyphenylene sulfide (PPS), a polyphenylene sulfone (PPSO2), a liquid crystal polymer (LCP), a polyether ether ketone (PEEK), an aromatic polyester (Ekonol), or any combination thereof.

The filler can be present in the sliding layer in an amount of at least about 1 vol %, at least about 5 vol %, at least about 10 vol %, at least about 15 vol %, at least about 20 vol %, at least about 25 vol %, at least about 30 vol %, at least about 35 vol %, at least about 40 vol %, at least about 50 vol %, at least about 60 vol %, at least about 70 vol %, at least about 80 vol %, or at least about 90 vol %.

In another example, the metallic support of the slide bearing can include steel, stainless steel, aluminum, bronze, cold-rolled steel material No. 1.0338, cold-rolled steel material No. 1.0347, matt zinc-plated steel, stainless steel material No. 1.4512, stainless steel material No. 1.4720, stainless steel material No. 1.4310, alloys, or any combinations thereof.

In an example, the slide bearing has a metal support that has a surface roughness of less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, less than about 1 micron.

In yet another example, the slide bearing according has a sliding layer that can include a perfluoroalkoxyethylene (PFA) and a polyether ether ketone (PEEK) in a ratio from about 5:95 to about 95:5, such as from about 10:90 to about 90:10, such as from about 20:80 to about 80:20, such as from about 30:70 to about 70:30, such as from about 40:60 to about 60:40, or such as about 50:50.

In another example, a slide bearing includes a metal support, a sliding layer, the sliding layer being extruded on and in direct contact with the metal support, wherein the sliding layer comprises a mixture of at least two polymers. The mixture can include one continuous phase and at least one discontinuous phase. In one further example, no other polymeric layer is in contact with the sliding layer.

In another example, the discontinuous phase can include droplets in the continuous phase. The droplets can have a primary aspect ratio of at least about 2:1, at least about 3:1, at least about 4:1, or at least about 5:1. In another example, the droplets have a secondary aspect ratio of at least about 1:1, at least about 2:1, at least about 3:1, or at least about 4:1.

In yet another example, at least 50 percent of the droplets can have a primary dimension not greater than about 30 microns, such as not greater than about 25 microns, not greater than about 20 microns, not greater than about 18 microns, not greater than about 15 microns, not greater than about 13 microns, or even not greater than about 10 microns.

In an related example, at least 50 percent of the droplets have a secondary dimension not greater than about 20 microns, such as not greater than about 18 microns, not greater than about 15 microns, not greater than about 13 microns, not greater than about 10 microns, not greater than about 8 microns, not greater than about 5 microns, or even not greater than about 3 microns.

In another example, the droplets can have a tertiary dimension not greater than about 20 microns, such as not greater than about 18 microns, not greater than about 15 microns, not greater than about 13 microns, not greater than about 10 microns, not greater than about 8 microns, not greater than about 5 microns, or even not greater than about 3 microns.

In an example, the slide bearing includes a sliding layer having droplets, wherein the droplets have an inhomogeneous distribution in size throughout the sliding layer.

In another example, the discontinuous phase can include polymers. The polymers can be selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), or any combination thereof.

In another example, the continuous phase can include a polymer selected from a polytetrafluoroethylene (PTFE), a modified polytetrafluoroethylene (TFM), a tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

In yet another example, a polymer of the sliding layer can include a functionalized polymer having functional groups. The functional group can be incorporated into the polymer.

The functional groups are selected from

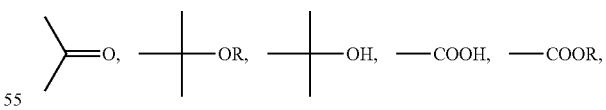

wherein R is selected from cyclic or linear organic groups having 1 to 20 carbon atoms In another example, the continuous phase further can include a filler. The filler can be selected from silicon dioxide, aluminum oxide, a titanium dioxide, a zirconium oxide, magnesium oxide, calcium oxide, boron oxide, aluminum carbonate, magnesium carbonate, calcium carbonate, a magnesium aluminum carbonate, an aluminum silicate, a calcium silicate, a magnesium silicate, a magnesium aluminum silicate, a bentonite, a kaolin, a mica, a talc, a silicon carbide, molybdenum sulfide, a bronze, a wollastonite, barium sulfate, glass fiber, glass bead, glass flake, carbon fiber, carbon nanotube, alumina fiber, silicon carbide fiber, ceramic fiber, ceramic material, gypsum fiber, carbon, graphite, an aramid, a nylon, a woven fabric, a polyimide (PI), a polyamidimide (PAI), a polyphenylene sulfide (PPS), a polyphenylene sulfone (PPSO2), a liquid crystal polymer (LCP), a polyether ether ketone (PEEK), an aromatic polyester (Ekonol), or any combination thereof.

The filler of the continuous phase can be present in the sliding layer in an amount of at least about 1 vol %, such as at least about 5 vol %, at least about 10 vol %, at least about 15 vol %, at least about 20 vol %, at least about 25 vol %, at least about 30 vol %, at least about 35 vol %, at least about 40 vol %, at least about 50 vol %, at least about 60 vol %, at least about 70 vol %, at least about 80 vol %, or at least about 90 vol %.

In another example, the sliding layer can have a perfluoroalkoxyethylene (PFA) as the continuous phase and a polyether ether ketone (PEEK) as the discontinuous phase.

In yet another example, a method for forming a sliding layer containing polymeric droplets includes blending at least two polymers P1 and P2. The method can further include heating the blend to form a polymer emulsion; The method may also include extruding the polymer emulsion onto a metal support to form a sliding layer.

In an example, P1 can be selected from a polytetrafluoroethylene (PTFE), a modified polytetrafluoroethylene (TFM), a tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

In another example, P2 can be selected from a polyimide (PI), a polyamidimide (PAI), a polyphenylene sulfide (PPS), a polyphenylene sulfone (PPSO2), a liquid crystal polymer (LCP), a polyether ketone (PEK), a polyether ether ketone (PEEK), polyethersulfone (PES), an aromatic polyester (Ekonol), or any combination thereof.

In another example, P1 is a perfluoroalkoxyethylene (PFA) and P2 is a polyether ether ketone (PEEK).

In one example, P1 can constitute at least about 1 wt %, such as at least about 2 wt %, at least about 5 wt %, at least about 10 wt %, at least about 20 wt %, at least about 30 wt %, at least about 40 wt %, or at least about 50 wt % of the blend. In another example, the amount of P2 is not greater than about 50 wt %, not greater than about 40 wt %, not greater than about 30 wt %, not greater than about 20 wt %, not greater than about 10 wt %, not greater than about 5 wt %, not greater than about 2 wt %, or not greater than about 1 wt % of the blend.

In yet another example, P1 and P2 can be in a wt % ratio of about 99:1, about 95:5, about 90:10, about 85:15, about 80:20, about 75:25, about 70:30, about 65:35, about 60:40, about 55:45, or about 50:50.

In another example, the method can further include adding a filler to the blend. The filler can be selected from silicon dioxide, aluminum oxide, a titanium dioxide, a zirconium oxide, magnesium oxide, calcium oxide, boron oxide, aluminum carbonate, magnesium carbonate, calcium carbonate, a magnesium aluminum carbonate, an aluminum silicate, a calcium silicate, a magnesium silicate, a magnesium aluminum silicate, a bentonite, a kaolin, a mica, a talc, a silicon carbide, molybdenum sulfide, a bronze, a wollastonite, barium sulfate, glass fiber, glass bead, glass flake, carbon fiber, carbon nanotube, alumina fiber, silicon carbide fiber, ceramic fiber, ceramic material, gypsum fiber, carbon, graphite, an aramid, a nylon, a woven fabric, a polyimide (PI), a polyamidimide (PAI), a polyphenylene sulfide (PPS), a polyphenylene sulfone (PPSO2), a liquid crystal polymer (LCP), a polyether ether ketone (PEEK), an aromatic polyester (Ekonol), or any combination thereof.

The filler can be added to the blend in an amount of at least about 1 vol %, at least about 5 vol %, at least about 10 vol %, at least about 15 vol %, at least about 20 vol %, at least about 25 vol %, at least about 30 vol %, at least about 35 vol %, at least about 40 vol %, at least about 50 vol %, at least about 60 vol %, at least about 70 vol %, at least about 80 vol %, or at least about 90 vol %.

In another example, the can further include roughening the surface of the metal support prior to the extruding of the polymer emulsion. Yet, in another example, the method can further include coating the surface of the metal support with a coating metal prior to the extruding of the polymer emulsion. The coating metal can be selected from chromium, molybdenum, tungsten, manganese, ruthenium, osmium, cobalt, rhodium, iridium, nickel, palladium, platinum, copper, silver, gold, zinc, or cadmium.

The coating process can be selected from electroplating, electroless plating, cladding, galvanizing, hot dip galvanizing, vapor depositing, or sputter depositing.

Yet in another example, the method can further include structuring the metal support prior to the extruding of the polymer emulsion. The structuring can be selected from brush-finishing, sand-blasting, etching, perforating, pickling, punching, pressing, curling, deep drawing, decambering, incremental sheet forming, ironing, laser cutting, rolling, hammering, embossing, undercutting, or any combinations thereof.

In even one further example, a slide bearing includes a metal support, a sliding layer, the sliding layer being in direct contact with the metal support, wherein the sliding layer can include a non-fluorinated thermoplastic in a fluoropolymer matrix. The fluoropolymer matrix includes at least one fluoropolymer. In an example, no other polymer layer is in contact with the sliding layer.

In an example, the fluoropolymer can be present in an amount of at least about 50 wt % of the combined weight of non-fluorinated thermoplastic and the fluoropolymer matrix. In another example, the amount can be at least about 60 wt %, at least about 70 wt %, at least about 80 wt %, or at least about 90 wt %.

In an example, the non-fluorinated thermoplastic can be selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), or any combination thereof.

In another example, the fluoropolymer can be selected from a polytetrafluoroethylene (PTFE), a modified polytetrafluoroethylene (TFM), a tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

In yet even another example, the fluoropolymer can include a functionalized polymer having functional groups which are incorporated into the fluoropolymer and the functional groups are selected from

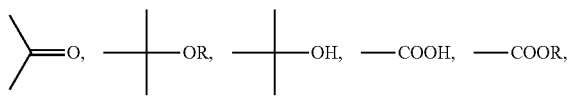

wherein R is selected from cyclic or linear organic groups having 1 to 20 carbon atoms Slide bearings can be prepared in a vast number of very different shapes and sizes. The smallest bearing, also called a pico bearing, is only a few μm in height compared to bearings for other applications that could be up to 500 mm.

Slide Bearings can include plane bearings, annular bearings, bushings, balljoint bearings (half spheres), plain bearings, axial bearings, thrust bearings, linear bearings, bearing shells, bearing cups and combinations thereof.

It is advantageous that the bearing is maintenance free. The term "maintenance-free" describes bearings that do not need to be greased as was the case for bearings in early car doors. Yet, the life time of maintenance-free bearings exceeds the average life time of the product these bearings are incorporated or the life time of conventional bearings applied for the same purpose.

Slide bearings are applied in a broad spectrum of commercial industry ranging from the heavy metal industry to the automotive and bike industry, even into baking industry, laptop/mobile phone hinges, bearings for solar applications and more.

Note that not all of the activities described above in the general description or the examples are required, that a portion of a specific activity may not be required, and that one or more further activities may be performed in addition to those described. Still further, the order in which activities are listed are not necessarily the order in which they are performed.

Without limiting the scope of the specification the following is a list of items in accordance with the concepts:

Item 1. A slide bearing comprising,
a metal support;
a sliding layer extruded on and in direct contact with the metal support, wherein the sliding layer comprises at least two polymers.

Item 2. The slide bearing according to item 1, wherein the at least two polymers comprise thermoplastics.

Item 3. The slide bearing according to item 1 or 2, wherein at least one polymer comprises a fluorinated thermoplastic.

Item 4. The slide bearing according to item 3, wherein the at least one fluorinated thermoplastic is selected from a polytetrafluoroethylene (PTFE), a modified polytetrafluoroethylene (TFM), tetrafluoroethylene-hexafluoropropylene (FEP), a perfluoroalkoxyethylene (PFA), an ethylene-tetrafluoroethylene (ETFE), a tetrafluoro-ethylene-perfluoro (methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

Item 5. The slide bearing according to item 4, wherein the at least one fluorinated thermoplastic comprises a functionalized polymer having functional groups which are incorporated into the fluorinated thermoplastic and the functional groups are selected from

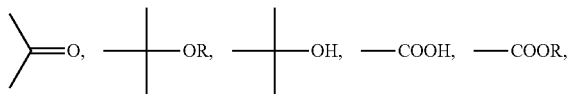

wherein R is selected from cyclic or linear organic groups having 1 to 20 carbon atoms.

Item 6. The slide bearing according to any one of the preceding items, wherein at least one polymer comprises a non-fluorinated thermoplastic.

Item 7. The slide bearing according to item 6, wherein the at least one non-fluorinated thermoplastic is selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), or any combination thereof.

Item 8. The slide bearing according to any one of items 6 or 7, wherein the fluorinated thermoplastic is present in the sliding layer in an amount greater than the amount of the non-fluorinated thermoplastic.

Item 9. The slide bearing according to any one of the preceding items, wherein the sliding layer further comprises a filler.

Item 10. The slide bearing according to item 8, wherein the filler is selected from silicon dioxide, aluminum oxide, a titanium dioxide, a zirconium oxide, magnesium oxide, calcium oxide, boron oxide, aluminum carbonate, magnesium carbonate, calcium carbonate, a magnesium aluminum carbonate, an aluminum silicate, a calcium silicate, a magnesium silicate, a magnesium aluminum silicate, a bentonite, a kaolin, a mica, a talc, a silicon carbide, molybdenum sulfide, a bronze, a wollastonite, barium sulfate, glass fiber, glass bead, glass flake, carbon fiber, carbon nanotube, alumina fiber, silicon carbide fiber, ceramic fiber, ceramic material, gypsum fiber, carbon, graphite, an aramid, a nylon, a woven fabric, a polyimide (PI), a polyamidimide (PAI), a polyphenylene sulfide (PPS), a polyphenylene sulfone (PPSO2), a liquid crystal polymer (LCP), a polyether ether ketone (PEEK), an aromatic polyester (Ekonol), or any combination thereof.

Item 11. The slide bearing according to items 9 or 10, wherein the filler is present in the sliding layer in an amount of at least about 1 vol %, at least about 5 vol %, at least about 10 vol %, at least about 15 vol %, at least about 20 vol %, at least about 25 vol %, at least about 30 vol %, at least about 35 vol %, at least about 40 vol %, at least about 50 vol %, at least about 60 vol %, at least about 70 vol %, at least about 80 vol %, or at least about 90 vol %.

Item 12. The slide bearing according to any one of the preceding items, wherein the metallic support comprises steel, stainless steel, aluminum, bronze, cold-rolled steel material No. 1.0338, cold-rolled steel material No. 1.0347, matt zinc-plated steel, stainless steel material No. 1.4512, stainless steel material No. 1.4720, stainless steel material No. 1.4310, alloys, or any combinations thereof.

Item 13. The slide bearing according to any one of the preceding items, wherein the metal support has a surface roughness of less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, less than about 1 micron.

Item 14. The slide bearing according to any one of the preceding items, wherein the sliding layer comprises a perfluoroalkoxyethylene (PFA) and a polyether ether ketone (PEEK) in a ratio from about 5:95 to about 95:5, such as from about 10:90 to about 90:10, such as from about 20:80 to about 80:20, such as from about 30:70 to about 70:30, such as from about 40:60 to about 60:40, or such as about 50:50.

Item 15. A slide bearing comprising,
a metal support;
a sliding layer extruded on and in direct contact with the metal support, wherein the sliding layer comprises a mixture of at least two polymers, wherein the mixture comprises one continuous phase and at least one discontinuous phase.

Item 16. The slide bearing according to item 15, wherein the discontinuous phase comprises droplets in the continuous phase.

Item 17. The slide bearing according to item 16, wherein the droplets have a primary aspect ratio of at least about 2:1, at least about 3:1, at least about 4:1, or at least about 5:1.

Item 18. The slide bearing according to item 16 or 17, wherein the droplets have a secondary aspect ratio of at least about 1:1, at least about 2:1, at least about 3:1, or at least about 4:1.

Item 19. The slide bearing according to any one of items 16 through 18, wherein at least 50 percent of the droplets have a primary dimension not greater than about 30 microns, not greater than about 25 microns, not greater than about 20 microns, not greater than about 18 microns, not greater than about 15 microns, not greater than about 13 microns, not greater than about 10 microns.

Item 20. The slide bearing according to any one of items 16 through 19, wherein at least 50 percent of the droplets have a secondary dimension not greater than about 20 microns, not greater than about 18 microns, not greater than about 15 microns, not greater than about 13 microns, not greater than about 10 microns, not greater than about 8 microns, not greater than about 5 microns, not greater than about 3 microns.

Item 21. The slide bearing according to any one of items 16 through 20, wherein at least 50 percent of the droplets have a tertiary dimension not greater than about 20 microns, not greater than about 18 microns, not greater than about 15 microns, not greater than about 13 microns, not greater than about 10 microns, not greater than about 8 microns, not greater than about 5 microns, not greater than about 3 microns.

Item 22. The slide bearing according to any one of items 16 through 21, wherein the droplets have an inhomogeneous distribution in size throughout the sliding layer.

Item 23. The slide bearing according to any one of items 15 through 22, wherein the discontinuous phase comprises polymers selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), or any combination thereof.

Item 24. The slide bearing according to any one of items 15 through 23, wherein the continuous phase comprises a polymer selected from a polytetrafluoroethylene (PTFE), a modified polytetrafluoroethylene (TFM), a tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

Item 25. The slide bearing according to item 24, wherein the polymer comprises a functionalized polymer having functional groups which are incorporated into the polymer and the functional groups are selected from

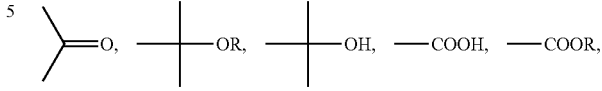

wherein R is selected from cyclic or linear organic groups having 1 to 20 carbon atoms Item 26. The slide bearing according to any one of items 15 through 25, wherein the continuous phase further comprises a filler.

Item 27. The slide bearing according to item 26, wherein the filler is selected from silicon dioxide, aluminum oxide, a titanium dioxide, a zirconium oxide, magnesium oxide, calcium oxide, boron oxide, aluminum carbonate, magnesium carbonate, calcium carbonate, a magnesium aluminum carbonate, an aluminum silicate, a calcium silicate, a magnesium silicate, a magnesium aluminum silicate, a bentonite, a kaolin, a mica, a talc, a silicon carbide, molybdenum sulfide, a bronze, a wollastonite, barium sulfate, glass fiber, glass bead, glass flake, carbon fiber, carbon nanotube, alumina fiber, silicon carbide fiber, ceramic fiber, ceramic material, gypsum fiber, carbon, graphite, an aramid, a nylon, a woven fabric, a polyimide (PI), a polyamidimide (PAI), a polyphenylene sulfide (PPS), a polyphenylene sulfone (PPSO2), a liquid crystal polymer (LCP), a polyether ether ketone (PEEK), an aromatic polyester (Ekonol), or any combination thereof.

Item 28. The slide bearing according to item 26 or 27, wherein the filler is present in the sliding layer in an amount of at least about 1 vol %, at least about 5 vol %, at least about 10 vol %, at least about 15 vol %, at least about 20 vol %, at least about 25 vol %, at least about 30 vol %, at least about 35 vol %, at least about 40 vol %, at least about 50 vol %, at least about 60 vol %, at least about 70 vol %, at least about 80 vol %, or at least about 90 vol %.

Item 29. The slide bearing according to any one of items 15 through 28, wherein the metallic support comprises steel, stainless steel, aluminum, bronze, cold-rolled steel material No. 1.0338, cold-rolled steel material No. 1.0347, matt zinc-plated steel, stainless steel material No. 1.4512, stainless steel material No. 1.4720, stainless steel material No. 1.4310, alloys, or any combinations thereof.

Item 30. The slide bearing according to any one of items 15 through 29, wherein the metal support has a surface roughness of less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, less than about 1 micron.

Item 31. The slide bearing according to any one of items 15 through 30, wherein the sliding layer comprises a perfluoroalkoxyethylene (PFA) as the continuous phase and a polyether ether ketone (PEEK) as the discontinuous phase.

Item 32. A method for forming a sliding layer containing polymeric droplets, the method comprising:
blending at least two polymers P1 and P2;
heating the blend to form a polymer emulsion;
extruding the polymer emulsion onto a metal support to form a sliding layer.

Item 33. The method according to item 32, wherein P1 is selected from a polytetrafluoroethylene (PTFE), a modified polytetrafluoroethylene (TFM), a tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

Item 34. The method according to item 32 or 33, wherein P2 is selected from a polyimide (PI), a polyamidimide (PAI), a polyphenylene sulfide (PPS), a polyphenylene sulfone (PPSO2), a liquid crystal polymer (LCP), a polyether ketone (PEK), a polyether ether ketone (PEEK), polyethersulfone (PES), an aromatic polyester (Ekonol), or any combination thereof.

Item 35. The method according to any one of items 32 through 34, wherein P1 is a perfluoroalkoxyethylene (PFA) and P2 is a polyether ether ketone (PEEK).

Item 36. The method according to any one of items 32 through 35, wherein P1 comprises at least about 1 wt %, at least about 2 wt %, at least about 5 wt %, at least about 10 wt %, at least about 20 wt %, at least about 30 wt %, at least about 40 wt %, or at least about 50 wt % of the blend.

Item 37. The method according to any one of items 32 through 36, wherein P2 comprises not greater than about 50 wt %, not greater than about 40 wt %, not greater than about 30 wt %, not greater than about 20 wt %, not greater than about 10 wt %, not greater than about 5 wt %, not greater than about 2 wt %, or not greater than about 1 wt % of the blend.

Item 38. The method according to any one of the items 32 through 37, wherein P1 and P2 are in a wt % ratio of about 99:1, about 95:5, about 90:10, about 85:15, about 80:20, about 75:25, about 70:30, about 65:35, about 60:40, about 55:45, or about 50:50.

Item 39. The method according to items any one of the items 32 through 38, further comprising adding a filler to the blend.

Item 40. The method according to item 39, wherein the filler is selected from silicon dioxide, aluminum oxide, a titanium dioxide, a zirconium oxide, magnesium oxide, calcium oxide, boron oxide, aluminum carbonate, magnesium carbonate, calcium carbonate, a magnesium aluminum carbonate, an aluminum silicate, a calcium silicate, a magnesium silicate, a magnesium aluminum silicate, a bentonite, a kaolin, a mica, a talc, a silicon carbide, molybdenum sulfide, a bronze, a wollastonite, barium sulfate, glass fiber, glass bead, glass flake, carbon fiber, carbon nanotube, alumina fiber, silicon carbide fiber, ceramic fiber, ceramic material, gypsum fiber, carbon, graphite, an aramid, a nylon, a woven fabric, a polyimide (PI), a polyamidimide (PAI), a polyphenylene sulfide (PPS), a polyphenylene sulfone (PPSO2), a liquid crystal polymer (LCP), a polyether ether ketone (PEEK), an aromatic polyester (Ekonol), or any combination thereof.

Item 41. The method according to items any one of the items 39 and 40, wherein the filler is added to the blend in an amount of at least about 1 vol %, at least about 5 vol %, at least about 10 vol %, at least about 15 vol %, at least about 20 vol %, at least about 25 vol %, at least about 30 vol %, at least about 35 vol %, at least about 40 vol %, at least about 50 vol %, at least about 60 vol %, at least about 70 vol %, at least about 80 vol %, or at least about 90 vol %.

Item 42. The method according to any one of the items 32 through 41, further comprising roughening the surface of the metal support prior to the extruding of the polymer emulsion.

Item 43. The method according to any one of the items 32 through 42, further comprising coating the surface of the metal support with a coating metal prior to the extruding of the polymer emulsion.

Item 44. The method according to item 43, wherein the coating metal is selected from chromium, molybdenum, tungsten, manganese, ruthenium, osmium, cobalt, rhodium, iridium, nickel, palladium, platinum, copper, silver, gold, zinc, or cadmium.

Item 45. The method according to item 43 or 44, wherein the coating is selected from electroplating, electroless plating, cladding, galvanizing, hot dip galvanizing, vapor depositing, or sputter depositing.

Item 46. The method according to any one of items 32 through 45, further comprising structuring the metal support prior to the extruding of the polymer emulsion.

Item 47. The method according to item 46, wherein the structuring is selected from brush-finishing, sand-blasting, etching, perforating, pickling, punching, pressing, curling, deep drawing, decambering, incremental sheet forming, ironing, laser cutting, rolling, hammering, embossing, undercutting, or any combinations thereof.

Item 48. A slide bearing comprising,
a metal support;
a sliding layer in direct contact with the metal support, the sliding layer comprising a non-fluorinated thermoplastic in a fluoropolymer matrix, the fluoropolymer matrix comprising at least one fluoropolymer.

Item 49. The sliding bearing according to item 48, wherein the at least one fluoropolymer is present in an amount of at least about 50 wt % of the combined weight of non-fluorinated thermoplastic and the fluoropolymer matrix.

Item 50. The sliding bearing according to item 49, wherein the amount is at least about 60 wt %, at least about 70 wt %, at least about 80 wt %, or at least about 90 wt %.

Item 51. The sliding bearing according to any one of items 48 through 50, wherein the non-fluorinated thermoplastic is selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), or any combination thereof.

Item 52. The slide bearing according to any one of items 48 through 51, wherein the at least one fluoropolymer is selected from a polytetrafluoroethylene (PTFE), a modified polytetrafluoroethylene (TFM), a tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

Item 53. The slide bearing according to item 52, wherein the at least one fluoropolymer comprises a functionalized polymer having functional groups which are incorporated into the fluoropolymer and the functional groups are selected from

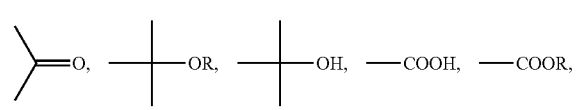

wherein R is selected from cyclic or linear organic groups having 1 to 20 carbon atoms.

Item 54. The slide bearing according to any one of items 48 through 53, wherein the sliding layer further comprises a filler.

Item 55. The slide bearing according to item 54, wherein the filler is selected from silicon dioxide, aluminum oxide, a titanium dioxide, a zirconium oxide, magnesium oxide, calcium oxide, boron oxide, aluminum carbonate, magnesium carbonate, calcium carbonate, a magnesium aluminum carbonate, an aluminum silicate, a calcium silicate, a magnesium silicate, a magnesium aluminum silicate, a bentonite, a kaolin, a mica, a talc, a silicon carbide, molybdenum sulfide, a bronze, a wollastonite, barium sulfate, glass fiber, glass bead, glass flake, carbon fiber, carbon nanotube, alumina fiber, silicon carbide fiber, ceramic fiber, ceramic material, gypsum fiber, carbon, graphite, an aramid, a nylon, a woven fabric, a polyimide (PI), a polyamidimide (PAI), a polyphenylene sulfide (PPS), a polyphenylene sulfone (PPSO2), a liquid crystal polymer (LCP), a polyether ether ketone (PEEK), an aromatic polyester (Ekonol), or any combination thereof.

Item 56. The slide bearing according to item 54 or 55, wherein the filler is present in the sliding layer in an amount of at least about 1 vol %, at least about 5 vol %, at least about 10 vol %, at least about 15 vol %, at least about 20 vol %, at least about 25 vol %, at least about 30 vol %, at least about 35 vol %, at least about 40 vol %, at least about 50 vol %, at least about 60 vol %, at least about 70 vol %, at least about 80 vol %, or at least about 90 vol %.

Item 57. The slide bearing according to any one of items 48 through 56, wherein the metallic support comprises steel, stainless steel, aluminum, bronze, cold-rolled steel material No. 1.0338, cold-rolled steel material No. 1.0347, matt zinc-plated steel, stainless steel material No. 1.4512, stainless steel material No. 1.4720, stainless steel material No. 1.4310, alloys, or any combinations thereof.

Item 58. The slide bearing according to any one of items 48 through 57, wherein the metal support has a surface roughness of less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, less than about 1 micron.

Item 59. The slide bearing according to any one of items 48 through 58, wherein the at least fluoropolymer comprises a perfluoroalkoxyethylene (PFA) and the non-fluorinated thermoplastic is a polyether ether ketone (PEEK).

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A slide bearing comprising,
a metal support; and
a sliding layer extruded on and in direct contact with the metal support, wherein the sliding layer comprises one a fluorinated thermoplastic and one a non-fluorinated thermoplastic, wherein the fluorinated thermoplastic is comprises at least 60 wt % of the sliding layer, wherein the sliding layer comprises edges and a center region disposed between the edges, and wherein the fluorinated and non-fluorinated thermoplastics are disposed along the center region and edges wherein the fluorinated thermoplastic comprises a functionalized polymer.

2. The slide bearing according to claim 1, wherein the fluorinated thermoplastic is selected from a polytetrafluoroethylene (PTFE), a modified polytetrafluoroethylene (TFM), tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

3. The slide bearing according to claim 2, wherein the functionalized polymer has functional groups which are incorporated into the fluorinated thermoplastic and the functional groups are selected from

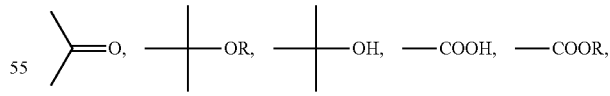

wherein R is selected from cyclic or linear organic groups having 1 to 20 carbon atoms.

4. The slide bearing according to claim 1, wherein the at least one non-fluorinated thermoplastic is selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), or any combination thereof.

5. The slide bearing according to claim 1, wherein the sliding layer further comprises a filler.

6. The slide bearing according to claim 5, wherein the filler is selected from silicon dioxide, aluminum oxide, a titanium dioxide, a zirconium oxide, magnesium oxide, calcium oxide, boron oxide, aluminum carbonate, magnesium carbonate, calcium carbonate, a magnesium aluminum carbonate, an aluminum silicate, a calcium silicate, a magnesium silicate, a magnesium aluminum silicate, a bentonite, a kaolin, a mica, a talc, a silicon carbide, molybdenum sulfide, a bronze, a wollastonite, barium sulfate, glass fiber, glass bead, glass flake, carbon fiber, carbon nanotube, alumina fiber, silicon carbide fiber, ceramic fiber, ceramic material, gypsum fiber, carbon, graphite, an aramid, a nylon, a woven fabric, a polyimide (PI), a polyamidimide (PAI), a polyphenylene sulfide (PPS), a polyphenylene sulfone (PPSO2), a liquid crystal polymer (LCP), a polyether ether ketone (PEEK), an aromatic polyester (Ekonol), or any combination thereof.

7. The slide bearing according to claim 5, wherein the filler is present in the sliding layer in an amount of at least about 1 vol %.

8. A slide bearing comprising,
a metal support; and
a sliding layer extruded on and in direct contact with the metal support, wherein the sliding layer comprises a mixture of at least two polymers, wherein the mixture comprises one continuous phase, wherein the continuous phase comprises a fluorinated thermoplastic, and at least one discontinuous phase, and wherein at least a portion of both of the at least two polymers contact the metal support.

9. The slide bearing according to claim 8, wherein the discontinuous phase comprises droplets in the continuous phase.

10. The slide bearing according to claim 9, wherein the droplets have a primary aspect ratio of at least about 2:1.

11. The slide bearing according to claim 9, wherein at least 50 percent of the droplets have a primary dimension not greater than about 30 microns.

12. The slide bearing according to claim 8, wherein the discontinuous phase comprises polymers selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), or any combination thereof.

13. The slide bearing according to claim 8, wherein the fluorinated thermoplastic is selected from a polytetrafluoroethylene (PTFE), a modified polytetrafluoroethylene (TFM), a tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

14. A method for forming a sliding layer containing polymeric droplets, the method comprising:
blending at least two polymers P1 and P2 to form a blend, wherein P1 is at least 60 wt % of the blend;
heating the blend to form a polymer emulsion; and
extruding the polymer emulsion onto a metal support to form a sliding layer such that the metal support is contacted by both polymers P1 and P2.

15. The method according to claim 14, wherein P1 is selected from a polytetrafluoroethylene (PTFE), a modified polytetrafluoroethylene (TFM), a tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), or any combination thereof.

16. The method according to claim 14, wherein P2 is selected from a polyimide (PI), a polyamidimide (PAI), a polyphenylene sulfide (PPS), a polyphenylene sulfone (PPSO2), a liquid crystal polymer (LCP), a polyether ketone (PEK), a polyether ether ketone (PEEK), polyethersulfone (PES), an aromatic polyester (Ekonol), or any combination thereof.

17. The method according to claims claim 14, further comprising adding a filler to the blend.

18. The method of claim 14, wherein the sliding layer comprises edges and a center region disposed between the edges, and wherein the polymers P1 and P2 are both disposed along the center region and edges.

19. The slide bearing of claim 1, wherein the metal support is contacted by both the fluorinated and non-fluorinated thermoplastics.

20. The slide bearing of claim 1, wherein the sliding layer includes droplets having a primary aspect ratio of at least 2:1 and a secondary aspect ratio of at least 1:1.

* * * * *

UNITED STATES PATENT AND TRADEMARK OFFICE
CERTIFICATE OF CORRECTION

PATENT NO. : 9,803,690 B2
APPLICATION NO. : 14/040383
DATED : October 31, 2017
INVENTOR(S) : Julia Ziegler et al.

Page 1 of 1

It is certified that error appears in the above-identified patent and that said Letters Patent is hereby corrected as shown below:

On the Title Page

Page 3, under "OTHER PUBLICATIONS", please delete "U.S. Appl. No. 113/728,405" and insert therefor --U.S. Appl. No. 13/728,405--.

In the Claims

Column 24, Claim 17, please delete "claims" after "according to" and before "claim 14".

Signed and Sealed this
Third Day of April, 2018

Andrei Iancu
*Director of the United States Patent and Trademark Office*